(No Model.)
H. WILLARD.
Now by marriage H. W. McNAIR.
DEVICE FOR STONING FRUIT.
No. 591,942.                 Patented Oct. 19, 1897.
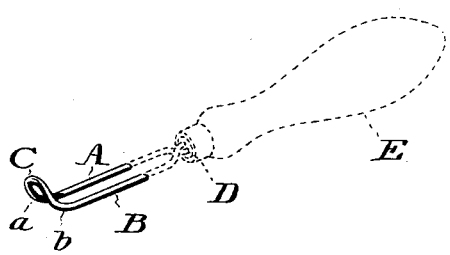
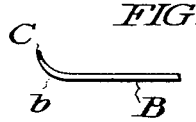
WITNESSES:
N. E. Paige
Thos. K. Lancaster.
H. Willard
INVENTOR:
By her attorneys
Strawbridge & Taylor

UNITED STATES PATENT OFFICE.

HELEN WILLARD, (NOW BY MARRIAGE HELEN WILLARD McNAIR,) OF PHILADELPHIA, PENNSYLVANIA.

DEVICE FOR STONING FRUIT.

SPECIFICATION forming part of Letters Patent No. 591,942, dated October 19, 1897.

Application filed January 23, 1897. Serial No. 620,305. (No model.)

*To all whom it may concern:*

Be it known that I, HELEN WILLARD, a citizen of the United States, residing in the city and county of Philadelphia, in the State of Pennsylvania, have invented certain new and useful Improvements in Devices for Stoning Fruit, of which the following is a specification.

It is the object of my invention to provide a simple, neat, inexpensive, and efficient, device, by the aid of which the stones may be very readily removed from fruit such as cherries, grapes, &c., the operation being performed by the aid of my improved device in such manner that the integrity of the fruit is very slightly impaired and very little of the body of the fruit removed with the stone, while, at the same time the device itself may be very quickly and thoroughly cleansed after use.

In the accompanying drawings I show, and hereinafter I describe a preferred embodiment of my invention, the particular subject-matter claimed as novel being hereinafter definitely specified.

In the drawings,

Figure 1 is a view in perspective of my improved device,—a typical form of handle being shown in dotted lines.

Figure 2 is a view in side elevation of the device, the handle being omitted.

Similar letters of reference indicate corresponding parts.

Broadly stated, my invention comprehends the provision of a device for removing stones from fruit, the same consisting of a loop preferably formed of wire, the side members of which are curved laterally in a common plane so that the bight of the loop exists above the level of the main wires of the loop.

In the accompanying drawings,

A B are the side wires of the loop, curved respectively in the regions *a b* near the outer end of the device, and C is the approximately transverse wire which connects the wire A to the wire B, at the outer end of the device, and constituting the bight of the loop.

The members A B C are, as shown, continuous of each other, and formed from a single piece or strand of wire.

In plan, the device represents a U-shaped loop, the looped or outer end of the device being, as stated, curved upward.

It is essential that the implement be so fashioned that its outer or operating end is round or rounded, as opposed to being of a sharp tapering form, inasmuch as an implement of this character formed with a too narrow or tapering end would fail to surround the fruit stone, or, if engaging it, would tend to bind upon said stone, so that the latter, upon the withdrawal of the implement from the fruit, would require to be manually dislodged from the implement.

The inner ends of the side wires A B may extend for any desired length and be connected with any desired kind of handle.

The said side wires A B may, as indicated by the dotted lines in Figure 1, be twisted together to form a shank D and entered in a wooden handle of conventional form E.

The disposition of the inner ends of the wires A B and the kind of handle employed, form, however, no part of my invention, which consists broadly in providing a device of the character set forth for removing stones from fruit.

The operation of the device will be readily understood.

The fruit being held between the thumb and finger of one hand and the stone-removing device in the other, the advance end or transverse member C is forced through the outer portion of the fruit and to a position first beneath and then on the far side of the stone, the implement as its advance end progresses through the fruit being swung or manipulated so that the curved portion of the wires A B pass through the opening made in the skin of the fruit by said advance end and do not further mutilate the same.

When the advance end of the device has passed beneath and behind the stone the stone will be engaged between the side wires and the transverse member C, and, upon the withdrawal of the implement, said stone will be retained in position therein during said withdrawal by the pressure of the fruit which naturally tends to close upon the stone and implement, and the stone will therefore be carried to the exterior of the fruit, whereupon it drops of itself from the implement.

Preferably the transverse member C is slightly flattened in order to constitute it a kind of knife-edge to adapt the device to be more readily entered within the body of the fruit.

Of course, this flattening may be carried to any degree; preferably, however, the extent to which the wire is flattened is comparatively slight in order that the strength of the wire may not be diminished.

The wire, of course, may be allowed to remain in its natural condition instead of being thus flattened.

In the use of the implement it is preferably inserted through the eye of the fruit, being the point where the stem of the fruit has been removed, this for the reason that the device enters the fruit more easily at that point, for the further reason that the stone in most fruits lies very close to that point, and for the reason that when the break caused by the implement is thus made in the eye it is less conspicuous.

In the use of my device the stone as removed is clean and practically free from any adhering pulp of the fruit, and the fruit remains very little altered in shape or appearance by the removal of the stone.

Having thus described my invention, I claim—

A device for removing stones and seeds from fruit, the same consisting of an approximately U-shaped loop formed of a wire-like strand of metal, said loop having two longitudinally-extending members, and a transverse member, said members being continuous of each other, the rounded end of the implement being upwardly curved so that its outer end is in a plane at a considerable distance above the plane of the longitudinally-extending members, and the inner ends of the longitudinally-extending members being formed into or provided with a suitable handle,—substantially as and for the purpose specified.

In testimony that I claim the foregoing as my invention I have hereunto signed my name this 20th day of January, A. D. 1897.

HELEN WILLARD.

In presence of
  F. NORMAN DIXON,
  THOS. K. LANCASTER.